Dec. 13, 1966   R. V. BLACKHURST ET AL   3,291,382
BLADED STRUCTURE, FOR EXAMPLE, FOR A GAS
TURBINE ENGINE COMPRESSOR
Filed March 26, 1965

Inventors
Robert Vaughan Blackhurst
Gordon Cyril May
By
Cushman, Darby & Cushman
Attorneys United States Patent Office 3,291,382
Patented Dec. 13, 1966

3,291,382
BLADED STRUCTURE, FOR EXAMPLE, FOR A GAS TURBINE ENGINE COMPRESSOR
Robert Vaughan Blackhurst, Ripley, and Gordon Cyril May, Allestree Park, England, assignors to Rolls-Royce Limited, Derby, England, a British company
Filed Mar. 26, 1965, Ser. No. 443,008
Claims priority, application Great Britain, May 8, 1964, 19,406/64
6 Claims. (Cl. 230—133)

This invention concerns a bladed structure such, for example, as a gas turbine engine compressor.

According to the present invention, there is provided a bladed structure comprising concentric inner and outer cylindrical casings with a honeycomb structure interposed therebetween and secured thereto, and a plurality of angularly spaced apart aerofoil shaped blades which are mounted in and secured to the honeycomb structure and which extend radially through holes in the inner casing.

It will be appreciated that the honeycomb structure not only braces the inner and outer casings together, so as to render the use of struts therebetween unnecessary, but also provides a convenient location for the securing of the blades.

The blades are preferably mounted in and secured to blocks of material located in holes in the honeycomb structure.

The blades, the blocks, and the inner and outer casings may all be formed of synthetic resin material.

The inner casing preferably comprises inner and outer layers of synthetic resin material with wire mesh interposed therebetween.

Each of the inner and outer casings may be made up of two half-cylindrical parts which are connected together by dowels, the dowels being located in blocks of material disposed in holes in the honeycomb structure.

The bladed structure may be secured to adjacent structure by dowels located in blocks of material disposed in holes in the honeycomb structure.

The invention also comprises a gas turbine engine compressor provided with a bladed structure as set forth above, the said blades being stator blades.

Additionally the invention comprises a gas turbine engine provided with such a compressor. Thus the gas turbine engine may for example be a vertical lift engine having a thrust to weight ratio of at least 8:1 and may have a thrust to weight ratio of 12:1, 16:1 or even more.

The term "vertical lift engine" as used in this specification is to be understood to mean an engine adapted to produce vertical lift forces on an aircraft independently of those generated aerodynamically by forward flight of the aircraft.

Figure 1:
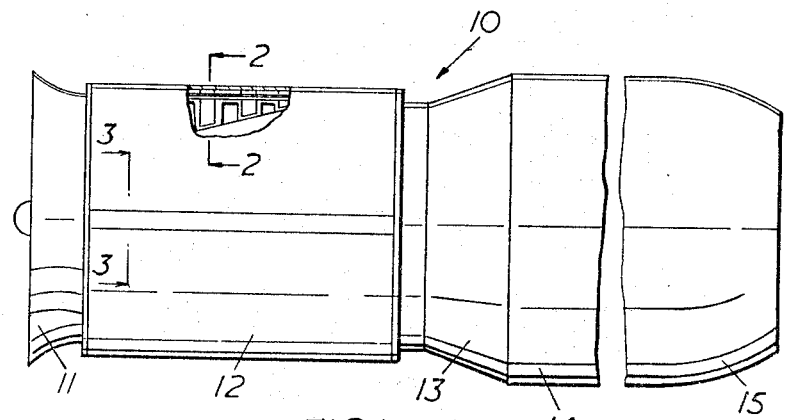
Figure 2:
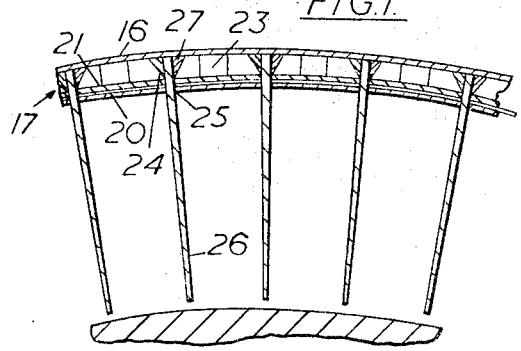
Figure 3:
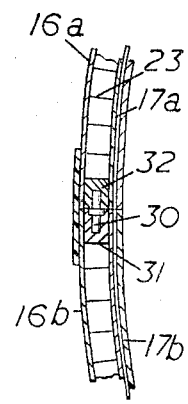
Figure 4:
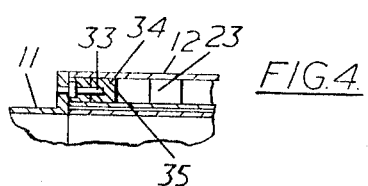
Figure 5:
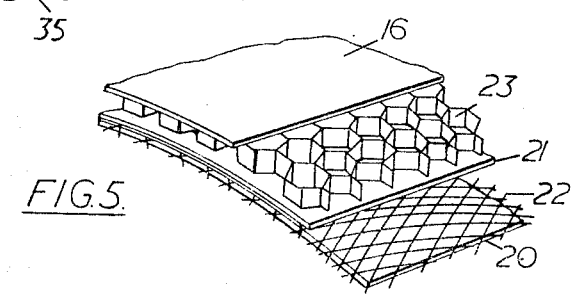

The invention is illustrated, merely by way of example, in the accompanying drawings, in which:

FIGURE 1 is a diagrammatic view, partly in section, of a gas turbine vertical lift engine incorporating a compressor according to the present invention, FIGURE 2 is a broken away sectional view taken on the line 2—2 of FIGURE 1, FIGURE 3 is a broken away sectional view taken on the line 3—3 of FIGURE 1, FIGURE 4 is a broken away sectional view illustrating a detail of the structure of the engine of FIGURE 1, and FIGURE 5 is a diagrammatic perspective view of part of the structure of the compressor of the said engine.

Referring to the drawings, a gas turbine vertical lift engine 10, having a thrust to weight ratio of at least 8:1, comprises in flow series an air intake 11, a compressor 12, combustion equipment 13 and a turbine 14, the turbine exhaust gases being directed to atmosphere through an exhaust duct 15.

The compressor 12 is provided with an outer cylindrical casing 16 of synthetic resin material within which is concentrically mounted a composite inner cylindrical casing 17. The inner casing 17, which is spaced from the outer casing 16, comprises an inner layer 20 and an outer layer 21 of synthetic resin material with a layer of wire mesh 22 interposed therebetween and bonded thereto.

Interposed between and bonded to the outer casing 16 and the composite inner casing 17 is a honeycomb structure 23. The honeycomb structure 23 is preferably formed of aluminium foil, although it may be formed of steel foil or of synthetic resin foil.

The honeycomb structure 23 has holes 24 punched therein whilst the inner casing 17 is provided with holes 25 which are aligned with the holes 24. A plurality of angularly spaced apart, aerofoil-shaped, stator blades 26 of synthetic resin material are respectively mounted in and extend radially through the aligned holes 24, 25 and are secured in the honeycomb structure 23 by means of being bonded by synthetic resin material located in the holes 24. The synthetic resin solidifies and forms blocks 27 within the holes 24.

The outer casing 16 is, as shown in FIGURE 3, made up of two half-cylindrical parts 16a and 16b, whilst the inner casing 17 is, as shown in FIGURE 3, made up of two half-cylindrical parts 17a and 17b. These half-cylindrical parts are connected together by means of dowels 30. The dowels 30 are held in position by forming holes 31 in the honeycomb structure 23 introducing synthetic resin into the holes 31, and locating the dowels 30 in the said synthetic resin. The synthetic resin solidifies and forms blocks 32.

Similarly the compressor 12 is, as shown in FIGURE 4, connected to the air intake 11 (and it may be similarly connected to the combustion equipment 13) by means of dowels 33 which are located in synthetic resin which solidifies to form blocks 34 disposed in holes 35 in the honeycomb structure 23.

The compressor construction shown in the drawings, having regard to the nature of the materials used in its fabrication, is very strong, especially in compression.

The use of the honeycomb structure 23 not only serves to brace the inner and outer casings 16, 17 together but it also provides a convenient location for the mounting of the blades 26. The use of the honeycomb structure 23 also facilitates the securing together of the half-cylindrical parts 16a, 16b, 17a, 17b as well as facilitating the connection of the compressor 12 to the adjacent structure on either side of it.

The composite form of the inner casing 17 provides it with a strength which enables it to resist abrasion by debris and which enables it to resist fracture if a blade should become loose.

Although the invention has been described with reference to the use of synthetic resin blades 26 in fact these blades could be made of aluminium or other metals.

We claim:

1. A bladed structure comprising concentric inner and outer cylindrical casings, the inner casing comprising inner and outer layers of synthetic resin material with wire mesh interposed therebetween, and the inner casing having a plurality of angularly spaced apart holes therein, a honeycomb structure interposed between said casings and secured thereto, and a plurality of angularly spaced apart aerofoil shaped blades which are mounted in and secured to the honeycomb structure and which extend radially through the holes in the inner casing.

2. A bladed structure comprising concentric inner and outer cylindrical casings, the inner casing comprising inner and outer layers of synthetic resin material with wire mesh interposed therebetween, and the inner casing having a plurality of angularly spaced apart holes therein, a honeycomb structure interposed between said casings and secured thereto, a plurality of angularly spaced apart blocks of synthetic resin material which are located in holes in the honeycomb structure, and a plurality of angularly spaced apart aerofoil shaped synthetic resin blades which are mounted in and secured to the said blocks of synthetic resin material in the honeycomb structure and which extend radially through the holes in the inner casing.

3. A bladed structure comprising concentric inner and outer cylindrical casings, each of which is made up of two half cylindrical parts, the inner casing comprising inner and outer layers of synthetic resin material with wire mesh interposed therebetween, the inner casing having a plurality of angularly spaced apart holes therein, dowels connecting together the parts of the respective casings, a honeycomb structure interposed between said casings and secured thereto, blocks of material disposed in holes in the honeycomb structure, the said dowels being disposed in said blocks, and a plurality of angularly spaced apart aerofoil shaped blades which are mounted in and secured to the honeycomb structure and which extend radially through the holes in the inner casing.

4. A bladed structure comprising concentric inner and outer cylindrical casings, the inner casing comprising inner and outer layers of synthetic resin material with wire mesh interposed therebetween, and the inner casing having a plurality of angularly spaced apart holes therein, a honeycomb structure interposed between said casings and secured thereto, a plurality of angularly spaced apart aerofoil shaped blades which are mounted in and secured to the honeycomb structure and which extend radially through the holes in the inner casing, structure mounted adjacent said bladed structure, blocks of material disposed in holes in the honeycomb structure, and dowels which are located in said blocks and which secure the bladed structure to the adjacent structure.

5. A bladed structure as claimed in claim 4 in which each of the inner and outer casings is made up of two half-cylindrical parts which are connected together by dowels, the dowels being located in blocks of material disposed in holes in the honeycomb structure.

6. A bladed structure as claimed in claim 4 in which the blades are mounted in and secured to blocks of material which are located in holes in the honeycomb structure, the blades, the blocks, and the outer casing all being formed of synthetic resin material.

References Cited by the Examiner

UNITED STATES PATENTS

| | | | |
|---|---|---|---|
| 2,857,093 | 10/1958 | Warnken | 230—133 |
| 3,095,138 | 6/1963 | Warnken | 253—77 |
| 3,118,593 | 1/1964 | Robinson et al. | 230—133 |

FOREIGN PATENTS

| | | |
|---|---|---|
| 1,057,993 | 11/1953 | France. |
| 1,290,100 | 2/1962 | France. |
| 720,956 | 12/1954 | Great Britain. |

OTHER REFERENCES 1,095,453, December 1960, German printed application.

DONLEY J. STOCKING, *Primary Examiner.*

HENRY F. RADUAZO, *Examiner.*